(12) United States Patent
Pichon et al.

(10) Patent No.: US 6,586,751 B1
(45) Date of Patent: Jul. 1, 2003

(54) LIGHT SOURCE POWER TESTER

(75) Inventors: Dean M. Pichon, Arlington, MA (US); Michael G. Dumont, Hampton, NH (US); J. Jeffrey Kablik, Tyngsboro, MA (US)

(73) Assignee: Focal, Inc., Lexington, MA (US)

( * ) Notice: Subject to any disclaimer, the term of this patent is extended or adjusted under 35 U.S.C. 154(b) by 0 days.

(21) Appl. No.: 09/303,054

(22) Filed: Apr. 30, 1999

Related U.S. Application Data

(60) Provisional application No. 60/083,999, filed on May 2, 1998, and provisional application No. 60/118,606, filed on Feb. 4, 1999.

(51) Int. Cl.$^7$ ................................................ G01N 23/00
(52) U.S. Cl. ................................. 250/474.1; 250/473.1
(58) Field of Search .......................... 250/474.1, 473.1, 250/372 R, 580, 252.1; 73/1.01

(56) References Cited

U.S. PATENT DOCUMENTS

| | | | |
|---|---|---|---|
| 3,203,322 A | | 8/1965 | Deile et al. |
| 3,591,810 A | * | 7/1971 | Jackson ........................ 73/356 |
| 3,604,930 A | * | 9/1971 | Allen ...................... 250/474.1 |
| 3,620,597 A | | 11/1971 | Schwartz et al. |
| 3,771,065 A | | 11/1973 | Goldberg et al. |
| 3,801,825 A | | 4/1974 | Schwartz et al. |
| 4,001,587 A | | 1/1977 | Panchenkov et al. |
| 4,087,687 A | | 5/1978 | Bean |
| 4,158,170 A | | 6/1979 | Sterling et al. |
| 4,212,535 A | | 7/1980 | Sanders et al. |
| 4,235,108 A | | 11/1980 | Patel |
| 4,238,352 A | | 12/1980 | Patel |
| 4,385,237 A | | 5/1983 | Drukaroff et al. |
| 4,389,217 A | | 6/1983 | Baughman et al. |
| 4,506,550 A | | 3/1985 | Sandhu |
| 4,559,546 A | | 12/1985 | Yip |
| 4,580,557 A | | 4/1986 | Hertzmann |

(List continued on next page.)

FOREIGN PATENT DOCUMENTS

FR 2 658 007 A1 8/1991

*Primary Examiner*—Scott J. Sugarman
*Assistant Examiner*—Richard Hanig
(74) *Attorney, Agent, or Firm*—Wolf, Greenfield & Sacks P.C.

(57) ABSTRACT

A device for testing the light power output of an optical system comprises a thermochromic element, a body element optionally providing collimation or other means of reproducible positioning, and optionally filters and attenuation. A preferred device fits onto the end of an optical power delivery system, and the thermochromic element changes color if the system output is above a defined threshold. An alternative device provides a flat target with a The device may be adapted to be sterilizable, and may be disposable. Optional means for ensuring that the light delivery system is operational during the measurement are provided.

27 Claims, 2 Drawing Sheets

U.S. PATENT DOCUMENTS

| | | |
|---|---|---|
| 4,594,507 A | 6/1986 | Elliott et al. |
| 4,644,948 A | 2/1987 | Lang et al. |
| 4,788,126 A | 11/1988 | Feldman et al. |
| 4,800,877 A | 1/1989 | Losch |
| 4,838,266 A | 6/1989 | Koziol et al. |
| 4,863,282 A | 9/1989 | Rickson et al. |
| 4,864,144 A | 9/1989 | McLaughlin et al. |
| 4,918,317 A | 4/1990 | Hess et al. |
| 4,920,364 A | 4/1990 | Andrews et al. |
| 4,934,782 A | 6/1990 | Soffer et al. |
| 4,964,735 A | 10/1990 | Sasnett et al. |
| 4,994,059 A | 2/1991 | Kosa et al. |
| 5,019,074 A | 5/1991 | Muller |
| 5,042,950 A | 8/1991 | Salmon, Jr. |
| 5,051,597 A | 9/1991 | Lewis et al. |
| 5,052,820 A | 10/1991 | McGinnis et al. |
| 5,057,099 A | 10/1991 | Rink |
| 5,084,623 A | 1/1992 | Lewis et al. |
| 5,099,132 A | 3/1992 | Ueno et al. |
| 5,130,658 A | 7/1992 | Bohmer |
| 5,167,235 A | 12/1992 | Seacord et al. |
| 5,206,118 A | 4/1993 | Sidney et al. |
| 5,218,610 A | 6/1993 | Dixon |
| 5,301,201 A | 4/1994 | Dutta et al. |
| 5,321,970 A | 6/1994 | Davies et al. |
| 5,347,297 A | 9/1994 | Gage |
| 5,354,323 A | 10/1994 | Whitebook |
| 5,395,356 A | 3/1995 | King et al. |
| 5,406,213 A | 4/1995 | Henley |
| 5,426,305 A | 6/1995 | Siebentritt, Jr. et al. |
| 5,436,115 A | 7/1995 | Mullis |
| 5,441,530 A | 8/1995 | Landry et al. |
| 5,451,792 A | 9/1995 | Maguire et al. |
| 5,460,627 A | 10/1995 | O'Donnell, Jr. |
| 5,479,260 A | 12/1995 | Fattinger |
| 5,493,121 A | 2/1996 | Fitzpatrick |
| 5,527,349 A | 6/1996 | Landry et al. |
| 5,569,238 A | 10/1996 | Shei et al. |
| 5,591,964 A | 1/1997 | Poole |
| 5,617,250 A * | 4/1997 | Hacker et al. ............ 250/474.1 |
| 5,621,525 A | 4/1997 | Vogeler et al. |
| 5,622,182 A | 4/1997 | Jaffe |
| 5,637,876 A | 6/1997 | Donahue et al. |
| 5,651,784 A | 7/1997 | Klopotek |
| 5,708,638 A | 1/1998 | Braat et al. |
| 5,712,485 A | 1/1998 | Broer et al. |
| 5,713,893 A | 2/1998 | O'Donnell, Jr. |
| 5,767,520 A | 6/1998 | Donahue et al. |
| 5,772,656 A | 6/1998 | Klopetek |
| 5,777,341 A | 7/1998 | Seiwatz et al. |
| 5,807,379 A | 9/1998 | L'Esperance, Jr. |

* cited by examiner

LIGHT SOURCE POWER TESTER

RELATED APPLICATIONS

This non-provisional application claims the benefit under Title 35, U.S.C. §119(e) of co-pending U.S. provisional application Ser. No. 60/083,999, filed May 2, 1998, entitled "Light Source Power Tester" by J. Jeffrey Kablik and U.S. provisional application Ser. No. 60/118,606, filed Feb. 4, 1999, entitled "Light Source Power Tester" by Dean M. Pichon et al., both incorporated herein by reference.

FIELD OF THE INVENTION

This invention relates to electromagnetic radiation output level testing, and more particularly to a device, removably attachable to the end of an optical fiber, allowing visual determination of whether light emitted by the fiber exceeds a threshold value.

BACKGROUND OF THE INVENTION

In many applications it is important to be able to verify that a system designed to deliver optical energy to a substrate is actually operating at the required level of delivered energy. For example, when light is applied to cure (e.g., by polymerization) a light-curable material, it can be important to know that sufficient energy has been delivered to accomplish the intended or required degree of cure. One common example of such a tester is a light meter, as used in photography. Other, representative examples are described in the following documents.

U.S. Pat. No. 5,772,656 describes a light source for use in ophthalmic procedures, including a photoreactive element that reacts with laser radiation in a manner proportional to the intensity or intensity profile of the laser beam and an aligner for disposing the photoreactive element in the path of a laser beam.

U.S. Pat. Nos. 5,441,530 and 5,527,349 describe a photochemotherapy dosimeter for monitoring cumulative photochemotherapy radiation dosage. The dosimeter includes an optical fiber having a chemical cell containing a photobleachable chemical attached at one end. The chemical cell, in use, is positioned near abnormal tissue which is subjected to photochemotherapy treatment.

U.S. Pat. No. 4,863,282 describes a sun heat radiation sensor including a heat activatable liquid crystal composition selected to provide quantitative visual indication of sun heat radiation.

U.S. Pat. Nos. 5,019,074, 5,395,356 and 5,807,379 describe, generally, laser systems for reprofiling a surface, including a laser and an erodible element disposed between the laser and the surface to be reprofiled to provide a predefined profile of resistance to erosion by laser radiation. Upon irradiation of the element, a portion of the laser radiation is selectively absorbed and another portion is transmitted to the surface in accordance with the element profile to selectively erode the surface.

U.S. Pat. No. 5,052,820 describes thermo-optical sensing devices provided at various sections of an optical fiber that exhibit temperature dependent indices of refraction. The sensing devices define temperature sensitive areas that control the transmission of light through the optical fiber thereby allowing detection of temperature changes along the fiber.

U.S. Pat. No. 5,051,597 describes a radiation dosage indicator including visible indicia that exhibits a change depending upon whether the indicator has been irradiated.

While the above and other references describe, in many cases, useful testing devices, many of these systems have drawbacks. For example, in certain applications where a light meter is used, the light meter needs to be calibrated, and is vulnerable to loss of battery power, especially when used irregularly. Moreover, electronic instruments can be difficult to sterilize, for use in a surgical or other medical environment, or in a clean room.

Accordingly, it is an object of the present invention to provide a simplified, improved electromagnetic radiation tester.

SUMMARY OF THE INVENTION

The present invention provides an electromagnetic radiation power output testing device (herein, a "power tester", a "tester" or simply a "device") that can provide a response when an appropriate level of energy is provided to the device from a source of electromagnetic radiation, to insure that exposure of a target article or a patient to electromagnetic radiation will accomplish an intended effect.

Because of the cost and difficulty of sterilizing items in a safe and validatable manner, in one embodiment of the invention the tester is designed for sterilization. The tester is preferably disposable, to eliminate the need for recalibration, cleaning and resterilization. This in turn makes it advantageous to have a power tester which is inexpensive to fabricate, yet which can be easily designed and adapted for use in a particular situation. In its simplest embodiment, the tester is a device for determining electromagnetic radiation emission. The device includes a photoresponsive element constructed and arranged to be positioned in a fixed spatial relationship with respect to a source of electromagnetic radiation. In one embodiment, the device is arranged for removable attachment to a selected source of electromagnetic radiation. The element is capable of exhibiting a change in a visible characteristic responsive to electromagnetic radiation from the source to which it is attached. The photoresponsive element is not ablated by the electromagnetic radiation.

In another embodiment the device includes a thermochromic element mounted on a positioner providing a fixed spatial relationship between an optical source and the thermochromic element. A preferred positioner is a body, which carries the thermochromic element and which mates to the output region of the optical system. To use the tester, it is aligned with the output of the optical source to be tested, for example by inserting a light fiber into an opening in a tester; and the optical source is operated for a defined period. A change in color (for example) of the thermochromic element signifies that the optical source is emitting sufficient power for its intended application.

In yet another embodiment the device is designed for determining whether a laser, constructed and arranged for use in a clinical procedure, emits light above a threshold level. The device in this embodiment includes a thermochromic element constructed and arranged for removable attachment to an end of an optical fiber connected to a laser. The thermochromic element exhibits a change in visible characteristic when its temperature exceeds a threshold value, and is positioned on a body removably attachable to an end of the optical fiber. The thermochromic element and body are, together, sterilizable in this embodiment.

In another aspect the invention provides methods for determining emission from a source of electromagnetic radiation. In one embodiment the method involves exposing a photoresponsive element to electromagnetic radiation from a source in proximity with the element, and determining whether interaction of the electromagnetic radiation with the photoresponsive element causes a change in the element. This change is indicative of a specific, predetermined threshold level of electromagnetic radiation acceptable for a specific procedure. The method involves using the source in the procedure if the level of electromagnetic radiation is acceptable. The source is rejected for use in the procedure if the level of electromagnetic radiation is not acceptable.

In another embodiment a method involves providing a tester, the tester comprising a thermochromic element capable of absorbing energy from a source of electromagnetic radiation. The thermochromic element is characterized in exhibiting a change in a visible characteristic when its temperature exceeds a threshold value. The tester also includes a positioner to hold the thermochromic element in a defined spatial relationship with respect to the light source. The detector is positioned at the output location of the source, and the source is operated for a predetermined length of time. Response of the thermochromic element then is observed, and observation of a response or lack of a response of the thermochromic element determines whether the electromagnetic radiation output does or does not exceed a predetermined level.

In methods and devices of the invention a demarcation zone can be provided on the photoresponsive element, the demarcation zone defining a testing zone. In this embodiment the tester can be positioned so that electromagnetic radiation output from a source illuminates essentially all of the testing zone, and observation of a response or lack of response of the testing zone is carried out.

Further useful features provided in systems and methods of the invention, in some embodiments, include optical wavelength filters; means for determining if the optical system is functioning; collimating elements; focusing elements, such as lenses; sterilizability; air draft minimization; thermal buffering; low cost, to provide disposability; and means for determining maximum power output or irradiance as well as minimum.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

FIGS. 2A–C schematically illustrate another embodiment of an electromagnetic radiation tester where FIG. 2A is a profile view, FIG. 2C is taken through line C—C of FIG. 2A, and FIG. 2B is taken through line B—B of FIG. 2C.

DETAILED DESCRIPTION OF THE INVENTION

In one embodiment a device of the invention is designed to determine if the power (also referred to herein as the intensity) or the total energy per unit time, emitted by a source of electromagnetic radiation does, or does not, exceed a particular threshold. The power emitted by a source is the amount of energy emitted per unit time, e.g., Joules/sec, by the source, for example in a directed beam emitted by the source. The energy, i.e. the total energy, emitted in a defined time is the integral of the power emission over time. When the beam is continuous and constant, for example from a light bulb or a continuous laser, then the amount of energy emitted is simply the power times the time. When the output is pulsed, as in some lasers, or in flash lamps, then the amount of energy emitted is the integral of the power over the pulse life, times the number of pulses in the measurement period. The device of the invention, which operates by detecting the total energy deposited in a photoresponsive element such as a thermochromic element over a defined time period, is suitable for either continuous or pulsed light sources, but will normally be exposed to a beam of light for only a fixed and definite period. However, as noted below, the testing device may also operate with continuous exposure to a continuous beam if the thermal conductivity of device allows it to have an appropriate temperature when it is at equilibrium with the beam. Thus, the devices of the invention may measure either the total energy emitted by a source in a defined period of time, or the intensity (or power level) of a source. These measures (power, energy) will each be used in the discussion below, and will not be distinguished unless the difference is critical.

The testing system includes a photoresponsive element capable of exhibiting a change in a visible characteristic responsive to electromagnetic radiation from a source, and a positioner designed to position the photoresponsive element in proximity of the electromagnetic radiation output of the source. The photoresponsive element can be a photoelectronic detector, a photochemically-responsive element, or a thermally-responsive element that responds to a change in temperature upon absorption of electromagnetic radiation energy. The photoresponsive element can be selected to abruptly change in visible characteristic at a threshold level of applied electromagnetic radiation, or at a particular temperature that can be reached due to application of a threshold level of applied electromagnetic radiation. The abrupt change can signify application of electromagnetic radiation below a particular threshold, or above a particular threshold, or several changes can be indicative of several threshold levels. Alternatively, the photoresponsive element can change in visible characteristic, optionally reversibly, in various ways upon application of various levels of electromagnetic radiation. That is, the photoresponsive element can exhibit a change abruptly in visible characteristic when exposed to a specific, predetermined threshold level of electromagnetic radiation from a source, or can change gradually at different applied levels of radiation, signifying over a spectrum the particular amount of electromagnetic radiation applied. Such photoresponsive elements are known in the art. A preferred photoresponsive element is a thermochromic element, and thermochromic elements are discussed primarily herein as exemplary of photoresponsive elements of the invention. The thermochromic element is adapted to have a visible response above a critical absorbed energy, or on attaining a particular temperature due to absorption of energy from the optical source. The positioner is designed to position, and preferably also to hold, the thermochromic element in a standard alignment and distance with respect to the beam output of the source. The positioner is preferably a body element, as described further below. Useful optional elements comprise collimation of the source; thermal buffering layers; protective windows; means for determining that the source is operational; wavelength filtration; partial or full gray-scale attenuation; and system properties of disposability, sterilizability, and stability in storage. The devices of the invention are simple and can be used with minimal training.

It is a feature, in preferred embodiments, that the photoresponsive element is free of ablation by the electromagnetic radiation. "Ablation", as used herein, does not include by definition melting, coagulation, or phase separation, rather, physical destruction such as described in U.S. Pat. Nos. 5,019,704, 5,807,379, and 5,393,356, incorporated herein by reference.

Figure 1:
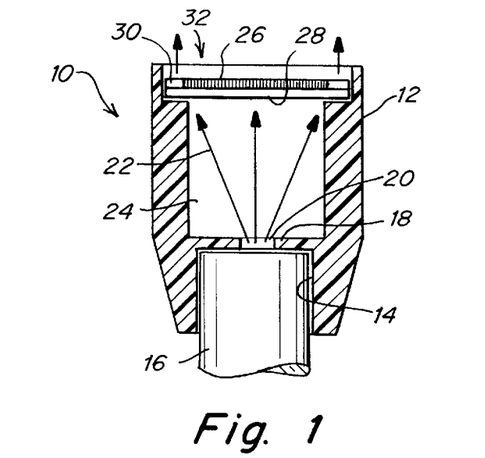
FIG. 1 schematically illustrates one embodiment of an electromagnetic radiation testing device in accordance with the invention.

Referring now to FIG. 1, a tester device 10 of the invention is illustrated, schematically, in cross-section. Device 10 includes a body 12 that is substantially annular for attachment to the end of an optical fiber. Body 12 includes an annular receptacle 14 at one end adapted to receive a source of electromagnetic radiation (the output end of an optical fiber 16). Receptacle 14 terminates, within body 12, at an annular ring 18 that limits its insertion into the body. Ring 18 includes an optical collimator 20 that allows passage of electromagnetic radiation (indicated by arrows 22) therethrough and into a cavity 24 in the central portion of the device. A photoresponsive element 26 is provided at an end of body 12 opposite receptacle 14, and is positioned within the body by a variety of techniques as described below. In the embodiment illustrated an optional intermediate layer 28 separates the photoresponsive element 26 from cavity 24. A clear annulus 30, at an output end 32 of the device allows observation of the functioning of the source of electromagnetic radiation. Where photoresponsive element 26 is a thermochromic element, the thermochromic element converts electromagnetic radiation 22 into thermal energy, and above a threshold amount of deposited and can change color.

Figure 2A:
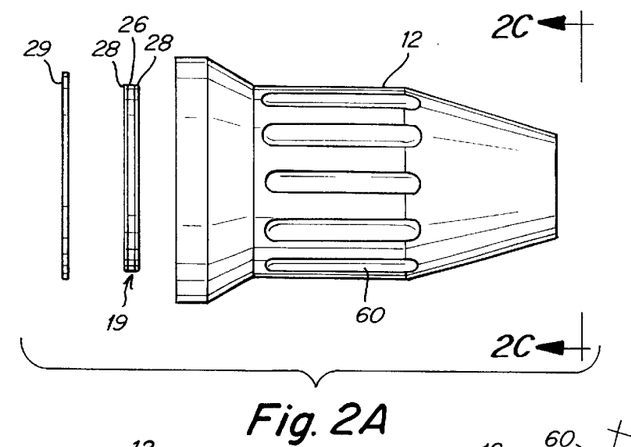

FIG. 2A shows the exterior of the body 12, which has knurled indentations 60. Indentations 60 are designed to be at least partially transparent to the electromagnetic radiation to be tested. At the output end of the body, a thermochromic element sandwich 19 is shown, which is fabricated from a central sheet of thermochromic material 26 laminated on each side to sheets of transparent polycarbonate 28. The polycarbonate sheets protect the thermochromic material during cutting to form discs, and also provide thermal insulation for the thermochromic material, increasing the thermal response time and thereby reducing the effects of drafts. A polycarbonate window 29 is provided to protect the thermochromic sandwich from drafts and from splashes of fluid, which can occur, for example, in a surgical environment.

Figure 2B:
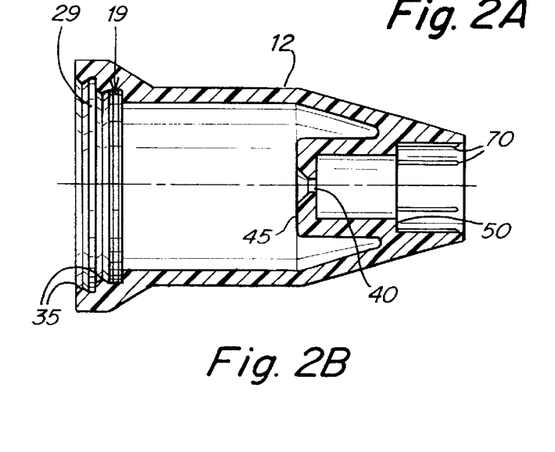
Figure 2C:
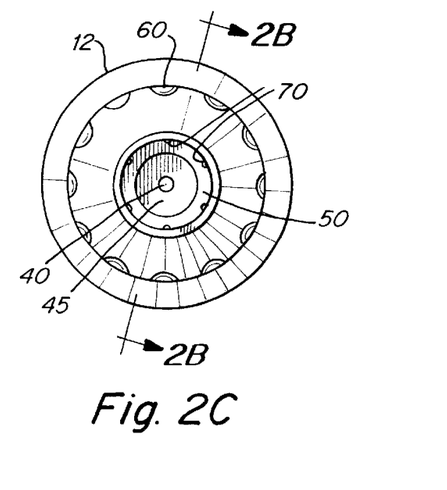

A longitudinal cross section of the body is shown in FIG. 2B, which is a cross-section through lines B—B of FIG. 2C, which is a cross-section through lines C—C of FIG. 2A. The window 29 and thermochromic sandwich 19 are shown fitted into undercut detents 35 in the body 30, which provide a snap-in fit and allow easy assembly of the device. An aperture 40 is provided in a collimating partition 45 to allow a defined portion of the optical output beam to impinge on the thermochromic sandwich 19. A stop 50 is provided to allow accurate positioning of an optical wand with respect to the collimating aperture 40. The snap fits of the thermochromic sandwich and window may be sufficiently loose to allow entry of gas into the tester (for example, for sterilization) while still giving sufficient retention on the body, and thermal buffering.

An end view of the body is shown in FIG. 2C, viewed from the right end. The knurl indents 60 are seen, as are the collimating partition 45, the collimating hole 40, and the stop 50. Also visible from this view are small vanes 70 which provide a friction fit with the optical wand (not shown) when it is inserted.

I) Photoresponsive Elements

The photoresponsive element, where it is a thermochromic element, exhibits a visible response when the amount of heat applied to the element exceeds a critical value. A preferred and familiar example of a thermochromic element suitable for the invention is a liquid crystal, which changes color upon application of heat. Such liquid crystal materials are well known and are commercially available. These changes may be reversible or irreversible. An example of a suitable reversible material is a liquid crystal-containing film which is black below a given temperature, and which becomes colored above that temperature. An example of an irreversible material is a type of disposable thermometer, in which each of a dozen of more dots has a different critical temperature at which it changes color, for example from colorless to blue.

Such thermally-sensitive materials can be used to determine the energy in an optical beam which is fully or partially absorbed or scattered by the thermochromic material, because the absorption or scattering deposits energy in the thermochromic element and thereby heats it at the site of energy deposition. When the system design is properly selected as explained below, the thermochromic element will change color only when there is sufficient energy in the optical beam to accomplish the desired purpose.

Many materials exhibit suitable thermochromic properties. In discussing such systems, it is useful to use a broad meaning of the term "thermochromic", so as to include any system which displays a visible change of state upon absorption of sufficient energy, with the exception of ablation, in preferred embodiments. Such systems may be reversible or irreversible, in which case the change of state does or does not persist after cessation of optical energy input.

Examples of such systems include, besides the liquid crystals, optically bleachable materials, such as solutions containing dyes; materials which melt, such as waxes, thermoplastic polymers, and low-melting metals (such as mischmetal); solutions containing heat-coagulatable materials, such as latexes or proteins; and materials which exhibit a change in opacity or scattering on heating, such as thermosensitive polymers and systems with temperature-dependent phase-separation behavior. The response of any of these systems may be enhanced or controlled by addition of suitable amounts or types of dyes, colloids or particles.

A preferable requirement of such systems is that they absorb a predictable amount of incident radiation from the source, which absorption preferably varies little with normal variations in ambient temperature (for example, within the normal range of "room" temperature, which is typically within the range of 15 to 30 deg. C.).

Another preferable feature of such systems is that their response should be monotonic within the prescribed range of operating conditions. For example, a thermoresponsive liquid crystal may be black below a particular temperature, and then exhibit a variety of colors, but not black, above the threshold; "blackness" is monotonic within the temperature range.

II) Positioner

A positioner reproducibly and reliably positions the thermochromic element in a particular geometric relationship with respect to the source. This is to provide reproducibility and reliability of the thermochromic response. Any known positioner may be used in the invention, provided that it is reliable and simple. In one embodiment, the positioner is a holder for the source of electromagnetic radiation and a holder for the photoresponsive element, with the holders maintained in a fixed relationship with each other, for example by being attached to a testing bench. Such an arrangement is useful for rapid testing of optical sources (for example, fiber optical systems) or for testing of thermochromic elements. This sort of positioner can be further simplified by placing a thermochromic sheet on a bench top, and placing the optical source on a stand above the sheet.

However, for many applications it is preferable to have the positioner be compact and portable. Such a positioner is here termed a "body", which is a piece of material with provisions for reproducibly receiving a photoresponsive element and electromagnetic radiation input.

The body may be made of any sufficiently stable material. The material is preferably inexpensive and easy to form into the desired shape, and preferably is compatible with one or more of the common means of sterilization (such as heat, ethylene oxide, ionizing radiation, plasma, etc.). The photoresponsive element may be held to the body by any convenient means, or combination thereof. Such means include use of an adhesive and mechanical retention. Mechanical retention means include spring clips, retaining rings including "O" rings and screw-in retainers, and slots, recesses or detents fabricated into the body. Any adhesive which is compatible with the other materials, and preferably with at least one sterilization procedure, is potentially suitable.

The body also should form a predictable fit with the particular source to be tested. A simple, effective means is to shape a slightly flexible body to have a reversible friction fit with the end of the optical source. Alternatively, a slot or hole may have flexible vanes to provide a friction fit, as further illustrated below. Other means include retaining clips, screw-on means, temporary adhesives (for example, as found in Post-It™ removable notes), and hook-loop retainers (e.g., Velcro™ closure strips.) The degree of precision of the fit depends on the degree of criticality of the power threshold; with good optical design of the body, a friction fit (for example) can be suitable for most applications. Most of these techniques provide a preferred arrangement in which the photoresponsive element is constructed for removable attachment to the electromagnetic radiation source. Collimation of the input beam tends to make the thermochromic response less sensitive to the exact position of the optical source with respect to the body.

It is preferable, although not required, that the body be opaque or substantially opaque to minimize the effect of ambient light on the response of the thermochromic element.

A preferred material for the body is polyethylene, preferably rendered substantially opaque by use of a particulate filler or other pigment. A preferred method for manufacture of the body is injection molding. Preferred techniques for retention of the thermochromic element on the body include adhesives in combination with close-fitting cavities, as shown in FIG. 1, and snap-in detents in the body, as illustrated in FIG. 2. Preferred techniques of fitting the body to the source include friction fits against a detent on the body, as in FIG. 1, and flexible vanes in the receiving cavity, as shown in FIG. 2.

Figure 3:
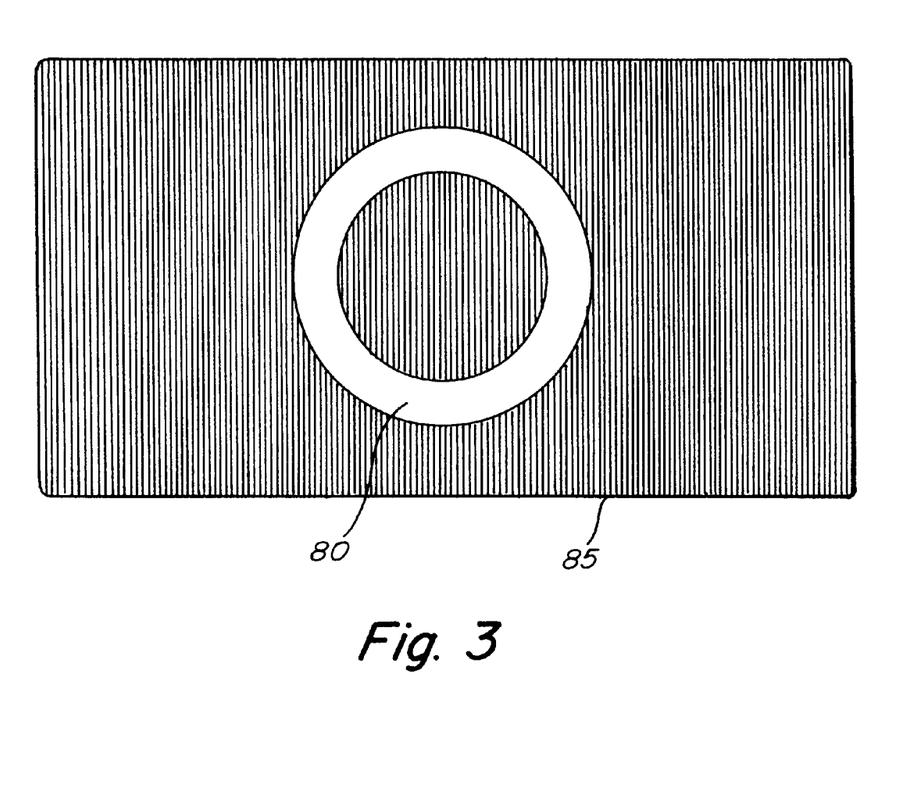
FIG. 3 illustrates a demarcation, defining a testing area, on a photoresponsive element.

As an alternative positioner, the thermochromic area may have a demarcation, such as a defined spot size. An example of this is shown in FIG. 3, in which an annular demarcation 80 is made, for example by printing, on a sheet of thermochromic material (85). The demarcation provides a way to align an optical beam, whether collimated, diverging, or approximately circular, in a defined attitude with respect to the thermochromic area. In use, the operator adjusts the angle of the optical source to provide, for example, a round spot on the card, and then adjusts the distance so that the spot just fills the demarcated area. Then, preferably after enough time to allow for return to thermal equilibrium, the source is activated for the desired amount of time, and change of color or appearance of the thermochromic test area is observed. The demarcation may conveniently be colored or otherwise printed to resemble the desired pattern or color at the threshold power intensity.

III) System Design

Many desirable thermochromic materials, such as the preferred thermochromic liquid crystals, are commercially available only in particular thicknesses and particular critical temperatures. These can readily be adapted to sense a required level of energy by appropriate design, requiring only routine experimentation.

Input variables in the design of the device include the type of electromagnetic radiation, the power level required, and the time for which the electromagnetic radiation is to be applied. For example, it may be required that a source emit 200 mW of optical energy, with the spectrum characteristic of that source, for 30 seconds. Samples of thermochromic materials are placed in the output beam, and distances selected such that about 30 seconds of exposure causes the diagnostic change. If the distance from the source is too great for convenience, then a less sensitive sample is used; or, the beam intensity is reduced by any known technique, such as collimation, filtering, or change of housing color (for example, from white to black). If the response is insufficient even with the thermochromic element very close to the output from the source, then a more sensitive thermochromic material is selected. One can readily determine the appropriate system design by such experiments.

Other variables which can be used during system design are the thickness and thermal conductivity of the thermochromic element, and other thermal buffering effects. In the design shown in FIG. 2, the thermochromic element is sheathed on both sides by a defined thickness of plastic transparent to the wavelength(s) being used (for example, "polycarbonate" for visible light). This sheathing material is not only mechanically protective of the thermochromic material, but provides thermal buffering, so that the heat generated by a relatively long optical exposure, such as 30 seconds, is not dissipated by air convection before the thermochromic material is heated enough to give a color response. The provision of thermal buffers thus dampens the response, requiring more energy deposition to obtain a given temperature in the thermochromic material (and so, more energy for a particular response). This buffering or damping minimizes the response of the element to rapid changes in the environment, for example air currents.

Likewise, the design of FIG. 2 shows a polycarbonate window between the thermochromic element sandwich and the observation point. This provides a closed space on that side of the thermochromic element, further decreasing the effects of drafts. The window also protects the thermochromic element from splashes of fluid, which would tend to distort the response.

Other design elements include optical filtering, to select particular wavelengths or wavelength bands before interaction with the thermochromic element. For example, only light of certain wavelengths might be effective in the system to which the light is applied. However, the tester can operate with no wavelength selection if the output spectrum of the source is stable. A "gray" or neutral filter may be used to decrease the incident energy if desired.

In the design of thermochromic assemblies (thermochromic element, buffers and windows if any) for testing devices which are reversible, the designer will be aware that there is thermal inertia in the device from any exposure, and that until the device has cooled to ambient temperatures, any repetition of the test (exposure to the light source) will require less energy to be deposited to obtain a detectable signal from the thermochromic element. A preferred design for minimizing the effects of device temperature, particularly applicable in longer (multisecond) exposures, is to set the thermochromic threshold so that it is the attainment of the maximum equilibrium temperature in the thermochromic assembly which triggers the thermochromic response. Thus, the temperature reaches the equilibrium a little earlier or later depending on the device's exact starting temperature, but will not reach the equilibrium temperature at all, during the exposure period, if the optical source is not emitting sufficient output.

IV) Source Operation Detection

While it can be useful to have a completely opaque body to minimize the effect of ambient light on the measurement, it is also useful to be able to observe that the optical source is operating, and that it operates for the desired length of time. This can be most easily accomplished by creating an opening, or a thin, translucent region, in the body. Another arrangement is shown in FIG. 1, in which a transparent annulus surrounds the thermochromic element. The operator can determine both that the operating cycle time, when present, is appropriate, and also see both the light output and the thermochromic material in one glance. That is, the body includes a section, other than the photoresponsive element, that is substantially opaque to the electromagnetic radiation and another portion, other than the photoresponsive element, that is at least partially transparent to the electromagnetic radiation.

Then, when the source stops operating or the light is otherwise interrupted, the thermochromic element can be observed for color or other change immediately, before the element has a chance to cool. (This is particularly important if the element is reversible, i.e., returns to its original state on cooling.) In the design in FIG. 2, the detection effect is obtained by making thin areas in the body.

If the light is not visible, or is dangerous, a secondary detector may be used to ensure that the beam has operated, such as fluorescent materials for detecting U.V., for example. These are not required to give a quantitative response.

Detection can also be accomplished by diversion of a portion of the beam to another viewing site, without necessarily interacting with the thermochromic tester. Any means of determining that the beam is operating, including devices such as photodetectors, can be used remotely.

V) Upper Limit Power Detection

In some cases it is important that the electromagnetic radiation power not exceed a threshold value (for example, in ophthalmic examination). The tester of the invention can be used for such purposes by designing a tester in which the photoresponsive element does not change color (or other property) until the power exceeds the threshold. Then change of property signifies that the power level of the beam exceeded the threshold.

In addition, both upper and lower thresholds can be combined in the same tester. For example, a split window can be created in which both a sufficient amount of power is detected by threshold on one area of the photoresponsive element, while an excessive amount of power is simultaneously detected on another area. There are several arrangements which can be used to achieve this objective. They include splitting of the beam, coupled with differential attenuation of portions of the beam or differential collimation of portions of the beam. The splitting can be as simple as a sheet of material, placed between the collimator and the thermochromic element, which is clear in one area and attenuating or filtering in the other. Then more energy is required to pass through the filtered portion of the beam to the corresponding area of the thermochromic element. An alternative is the provision of areas of photoresponsive material having different sensitivity to the beam. Provision of more than two levels of sensitivity is possible by the same methods. Maximizing separation of the differentially attenuated beam portions is also possible where needed; for example, lateral septa could be provided within the cavity of the body shown in FIG. 1 or 2.

In addition, or alternatively, two or more thermochromic materials having different responses to the beam may be mixed in order to either extend the range of response, or., if sufficiently separated in threshold temperature, to provide a dual response. For example, the material could turn to a first color, for example green, at a lower temperature which is sufficient for operability of the system, and to a second color, for example red, if the optical power output exceeded an upper threshold.

VI) Use

To use the power tester for detecting electromagnetic radiation output of a source, a tester as described herein is positioned in proximity to the output location of the source, and the source is operated for a pre-determined length of time. As used herein, "in proximity to" is meant to define a relationship in which the source and tester are within close enough proximity for a single person or a single group of people to manipulate (position and turn on and off) the source and the tester. Typically, this would be carried out in a single room, generally with only a foot or several feet of distance separating the source and the tester.

The predetermined period of time could be defined by a normal programmed cycle, if used by the apparatus being tested; or, for a continuous beam, an operating period will have been selected during tester design. Then the response of the thermochromic element is observed, and the response or lack of response of the thermochromic element determines whether the light power output does or does not exceed a predetermined level.

The light source power tester of the invention is useful in many situations. It is useful in medical applications in general and especially for operating rooms, where simplicity, reliability, sterility, and (increasingly) low cost are critical considerations. There are now many systems involving optical energy used in medicine, and it is important to check their output level before beginning the medical procedure, and in some cases afterwards as well. The tester of the invention is very simple to operate and can be used without significant training.

The properties of simplicity, reliability and low cost also make the power tester of the invention useful in testing of optical systems in the field. Such applications include clean room environments, hazardous environments, military systems and testing of optical communications systems. The latter will become more important as optical fiber reaches the home environment.

The application has been described thus far in terms with an emphasis on visible light. However, it is explicitly noted that the light detected by the device need not be visible light. The tester is also suitable for detecting the power level of light which is dangerous to view directly, such as UV light and high-power lasers, and for testing beams of light which cannot be seen, such as infrared light, particularly that emitted by infrared diode emitters, Nd:YAG lasers, and the like. The words "light" and "optical" as used herein refer to any electromagnetic radiation having a wavelength between about 150 nm and about 3000 nm 3 microns).

The function and advantage of these and other embodiments of the present invention will be more fully understood from the examples below. The following examples are intended to illustrate the benefits of the present invention, but do not exemplify the full scope of the invention.

VII) Example

Once in possession of the invention, it is a straightforward engineering process requiring only routine experimentation to create a power tested adapted to a particular need. This process is exemplified in the creation of the design depicted in FIG. 2.

A tester was created to indicate if the output of a light source, delivered through a fiber optic wand, was at least 100 mW per square centimeter. The light was filtered at the continuous source and was in the 450–550 nm band. In use, the light would be applied to a reactive resin material for 20 seconds to cure the material. Samples of a variety of thermochromic sheet materials were obtained. These were of various thickness, and responded to being warmed to near body temperature (about 35° C.) by changing color from black to any of several other colors (red, green, blue) depending on the exact temperature of the element. Such thermochromic sheet materials are widely known and available.

An optical source (light source plus delivery wand) was calibrated for energy output using a spectral radiometer. The calibrated wand was then held at various distances from the samples of thermochromic material. A distance was found at which one of the materials gave a response at a reasonable distance (about one to two centimeters). That material was selected for further study. A simple fixture was made which would hold the fiber optic wand's output end at a fixed distance ( about 2.5 cm) above a sheet of the thermochromic material. It was determined that the color change was found at all points examined of several sheets of the thermochromic material; that is, the material was sufficiently reproducible.

Output power density was reduced by increasing the distance to about 3 cm, and it was observed that the thermochromic material no longer changed color when the light was applied. Thus, the tester would correctly detect a significant loss in optical output through the system to the output of the wand.

A body was designed to make a disposable power tester. The completed result is shown in FIGS. 2A–2C. The actual length of the body used in this example was 31 mm. The body was made by injection molding of polypropylene containing titanium dioxide, and was in this embodiment white, and largely opaque except at indentations 60, which glowed when the light source was turned on.

The assembled devices of FIG. 2 are placed in sealed pouches and sterilized by a standard procedure using ethylene oxide gas. Sampling of the sterilized power testers showed that performance was not affected by the sterilization procedure used.

In the specification and claims of this patent application, the word "comprising" and variants thereof is intended in the sense of "including at least", as described in Sect. 2111.03 of the U.S. Manual of Patent Examining Procedure.

What is claimed is:

1. A device for determining electromagnetic radiation emission, comprising:
    a photoresponsive element constructed and arranged for removable attachment to a selected source of electromagnetic radiation, capable of exhibiting a change in a visible characteristic responsive to electromagnetic radiation from the source to which it is attached and being free of ablation by the electromagnetic radiation further comprising one or more of an optical source operation detector, a beam collimator a thermal buffering element, a window and an optical filter.

2. A device as in claim 1, wherein the photoresponsive element is capable of exhibiting a change in a visible characteristic when exposed to a specific, predetermined threshold level of electromagnetic radiation from the source.

3. A device as in claim 2, wherein the photoresponsive element exhibits a first, essentially uniform visible characteristic below the threshold level and a second, different, essentially uniform visible characteristic above the threshold level.

4. A device as in claim 1, wherein the device is removably attachable to the selected source of electromagnetic radiation by hand.

5. A device as in claim 1, wherein the photoresponsive element is a thermochromic element that exhibits a change in a visible characteristic when its temperature exceeds a threshold value.

6. A device as in claim 5, wherein the thermochromic element is selected from a thermoresponsive liquid crystal, an optically bleachable material, a meltable wax, a thermoplastic polymer, a low-melting metal, a solution containing heat-coagulatable materials, a material that exhibits a change in opacity or scattering on heating, and combinations thereof.

7. A device as in claim 1, wherein the source of electromagnetic radiation is a light source.

8. A device as in claim 1, wherein the source operation detector is at least one of an aperture, a window, a thin section in an element of the positioning means, and a fluorescent material.

9. A device as in claim 1, wherein the beam collimator means is at least one of an aperture, a tube, and a lens.

10. A device as in claim 1, wherein the thermal buffering element is at least one of a transparent material, a dyed material, a reflective material, and a space between other elements.

11. A device as in claim 1, wherein the photosensitive element is positioned on a body by at least one of friction fit couplings, clips, retaining rings, screw-in retainers, slots, recesses, detents fabricated into the body, hook-loop retainers, and adhesives, the body being removably attachable to the source of electromagnetic radiation.

12. A device as in claim 1, wherein the electromagnetic radiation is at least one of visible, infrared and ultraviolet light.

13. A device as in claim 2, wherein the photoresponsive element is constructed and arranged to signal more than one threshold of optical power emission.

14. A device as in claim 13, wherein the arrangement allowing signaling of more than one threshold is one or more of splitting of the beam, differential attenuation of portions of the beam, differential collimation of portions of the beam, and provision of areas of thermochromic material having different sensitivity to the beam.

15. A device as in claim 9, wherein the light has a wavelength between about 150 nm and about 3000 nm.

16. A device as in claim 1, wherein the source of electromagnetic radiation is an optical fiber and the element is constructed and arranged for removable attachment to an end of the fiber.

17. A device as in claim 1, wherein the element is constructed and arranged to be positioned in alignment with the output of the source.

18. A device as in claim 1, wherein the element is constructed and arranged to be positioned in alignment with the output of a laser.

19. A device as in claim 1, wherein the device is sterilizable.

20. A device as in claim 1, wherein the device is sterilized.

21. A device as in claim 1, wherein the photoresponsive element is mounted on a body removably attachable to the source, the body including a section that receives electromagnetic radiation from the source, the body including a portion other than the photoresponsive element that is substantially opaque to the electromagnetic radiation, and a portion other than the photoresponsive element that is partially translucent to the electromagnetic radiation.

22. A device as in claim 1, the photoresponsive element including a demarcation and an area within the demarcation defining a testing zone.

23. A method of determining whether the light power output of a source exceeds a threshold power level, the method comprising:
   a) providing a tester, the tester comprising a thermochromic element capable of absorbing energy from said source, said thermochromic element characterized in exhibiting a change in a visible characteristic when its temperature exceeds a threshold value, the tester further comprising one or more of optical source operation detector means, thermal buffering elements, windows, and optical filters;
   b) providing a demarcation on said thermochromic element where the area within said demarcation defines a testing zone;
   c) positioning said demarcated thermochromic element so that the light output from the source illuminates essentially all of said testing zone;
   d) operating said source for a pre-determined length of time; and
   e) observing the response of the area within the demarcated zone of said thermochromic element;
   whereby the observation of a response or lack of a response-of said thermochromic element determines whether said light power output does or does not exceed a predetermined level.

24. A method as in claim 23, wherein the thermal buffering element is at least one of a transparent material, a dyed material, a reflective material, and a space between other elements.

25. A method as in claim 23, wherein the thermochromic element is selected from a thermoresponsive liquid crystal, an optically bleachable material, a meltable wax, a thermoplastic polymer, a low-melting metal, a solution containing heat-coagulatable materials, a material which exhibit a change in opacity or scattering on heating, and combinations thereof.

26. A method as in claim 23, wherein the light is at least one of visible, infrared and ultraviolet light.

27. A method as in claim 23, wherein the tester is constructed and arranged to signal more than one threshold of optical power emission.

* * * * *